United States Patent [19]

Davis

[11] 4,308,896
[45] Jan. 5, 1982

[54] FABRIC REINFORCED HOSE

[75] Inventor: Delbert A. Davis, Kernersville, N.C.

[73] Assignee: Burlington Industries, Inc.

[21] Appl. No.: 108,701

[22] Filed: Dec. 31, 1979

[51] Int. Cl.³ .................. F16L 11/00; B65H 81/00
[52] U.S. Cl. ............................. 138/126; 138/125; 428/36; 156/187; 156/191
[58] Field of Search ................ 138/124, 125, 126; 428/36, 257; 156/187, 191

[56] References Cited

U.S. PATENT DOCUMENTS

| | | |
|---|---|---|
| 200,965 | 3/1878 | Baker . |
| 268,366 | 11/1882 | Gillespie . |
| 456,271 | 7/1891 | Herrick . |
| 486,621 | 11/1892 | Stowe . |
| 1,469,519 | 10/1923 | Lister . |
| 1,589,438 | 6/1926 | Short . |
| 2,795,029 | 6/1957 | Robertson et al. . |
| 3,030,230 | 4/1962 | Atwell . |
| 3,240,620 | 3/1966 | Atwell . |
| 3,240,649 | 3/1966 | Atwell . |
| 3,240,650 | 3/1966 | Atwell . |
| 3,240,651 | 3/1966 | Atwell . |
| 3,240,660 | 3/1966 | Atwell . |
| 3,506,515 | 4/1970 | Robinson et al. . |
| 3,679,516 | 7/1972 | McGee et al. . |
| 3,784,427 | 1/1974 | Griffin . |
| 3,816,994 | 6/1974 | Small . |
| 3,824,776 | 7/1974 | London, Jr. . |
| 3,848,404 | 11/1974 | London, Jr. . |
| 3,858,618 | 1/1975 | Kaufman . |
| 3,911,655 | 10/1975 | London, Jr. et al. . |
| 4,019,538 | 4/1977 | Desse et al. . |
| 4,055,697 | 10/1977 | Schmanski .................. 428/257 |

Primary Examiner—William R. Dixon, Jr.
Attorney, Agent, or Firm—Cushman, Darby & Cushman

[57] ABSTRACT

A fabric which is suitable for reinforcing hose structures, particularly railroad air brake hose is provided. The fabric is biased such that the warp and filling yarns intersect at angles between about 87° and 65°. When the biased fabric is used to reinforce a hose structure, one set of yarns is oriented in a circular fashion about the circumference of the hose in order to provide support against expansion of the hose under pressure.

7 Claims, 13 Drawing Figures

FABRIC REINFORCED HOSE

BACKGROUND OF THE INVENTION

The invention relates to a fabric reinforcement for a hose structure.

It has been known that hose structures of numerous varieties can be reinforced by layers of various fabrics. For example, the Robinson et al. U.S. Pat. No. 3,506,515 shows a hose which is reinforced by a fabric. However, it is noted that orientation of the yarns within the fabric is such that the filling yarns are perpendicular to the warp yarns of the fabric.

The Lister U.S. Pat. No. 1,469,519 shows a fabric layer similar to that of Robinson et al. and an additional layer having cords displaced in a diagonal direction with respect to the yarns of the first layer.

Reinforcing fabric layers are of particular importance in railroad air brake hose. Railroad air brake hose fabric has been made by using spun fabrics from natural and synthetic fiber. In order to maintain high strengths, these heavy fabrics have been tightly woven then calender coated with polymer, bias cut and wrapped around a mandrel and tube to form air brake hose.

By specification and design three or more layers of fabric that has been bias cut to 45° have been used to maintain burst strength and pass rigid railroad specifications. The use of bias cut fabric allows for hose flexibility and helps to resist buckling or kinking of the hose.

As a practical matter, hose manufacturers often acquire prefabricated fabrics for reinforcing hose from fabric manufacturers. For example, a hose manufacturer who might wish to modernize his hose building units, might require continuous rolls of 45° angle bias cut fabrics that have been impregnated with polymer and slit to a width convenient to cover the hose mandrels, give proper strength, and flex properties.

Despite the advantages of using bias cut fabrics in the reinforcement of railroad air brake hose, there remains a need in the art to develop a fabric reinforcement which will more readily enable the rigid railroad specifications to be met. Therefore, there is a need in the art to develop improved fabric reinforcements for hose structures.

SUMMARY OF THE INVENTION

It is the primary object of the present invention to provide an improved hose, hose fabric, and method of hose construction utilizing same, especially adapted for use as a railroad air brake hose. This and other objects of the invention will become clear from an inspection of the detailed description of the drawings, and the appended claims.

DETAILED DESCRIPTION OF THE DRAWINGS

Figure 2:
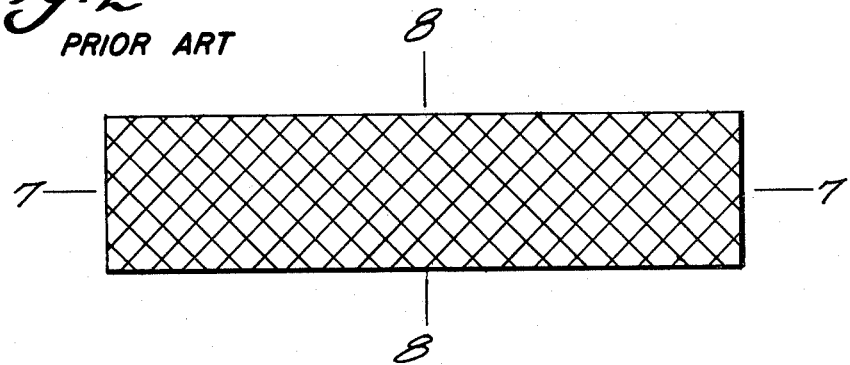
FIG. 2 is a side view of a hose structure reinforced with a bias cut fabric.
Figure 3:
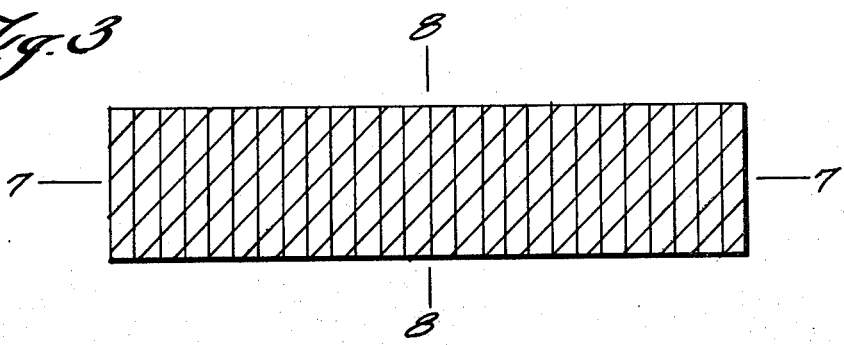
FIG. 3 respresents either a side view of a hose structure in accordance with the present invention or an elevation view of a fabric strip in accordance with the present invention.

For the purposes of more fully illustrating the features recited hereinbelow, FIGS. 1, 1A, 1B, 2, and 3 (particularly to the extent that FIG. 3 shows a hose structure) have been drawn as flattened-out, 2-dimensional representations of 3-dimensional objects.

Figure 1:
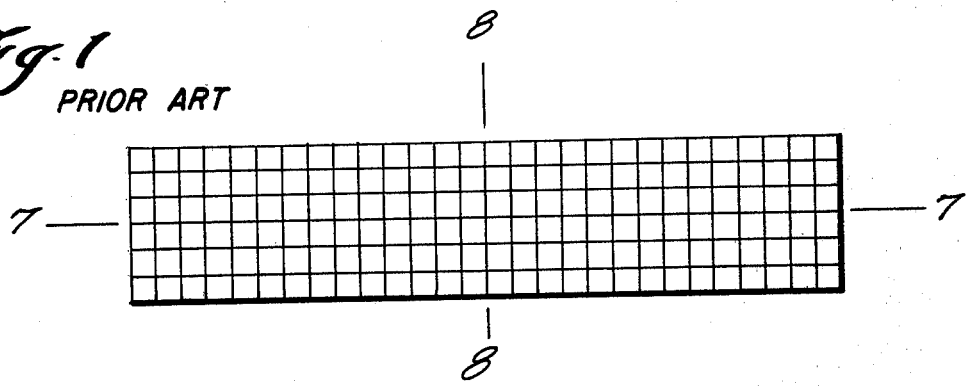
FIG. 1, FIG. 1A and FIG. 1B are side views of a fabric reinforced hose which illustrate how the problems of buckling or kinking can arise.

In FIG. 1 a reinforced hose of uniform diameter is illustrated. The reinforcing fabric of this hose contains warp and filling yarns as depicted by means of vertical and horizontal lines. One set of these lines, e.g., the filling yarns, is oriented parallel to the center line 7—7 of the hose. The other set of yarns, e.g., warp yarns, is perpendicular to the first set and is represented by lines parallel to line 8—8. This second set of yarns provides reinforcement against expansion of the hose when pressure is applied to the hose.

Figure 1A:
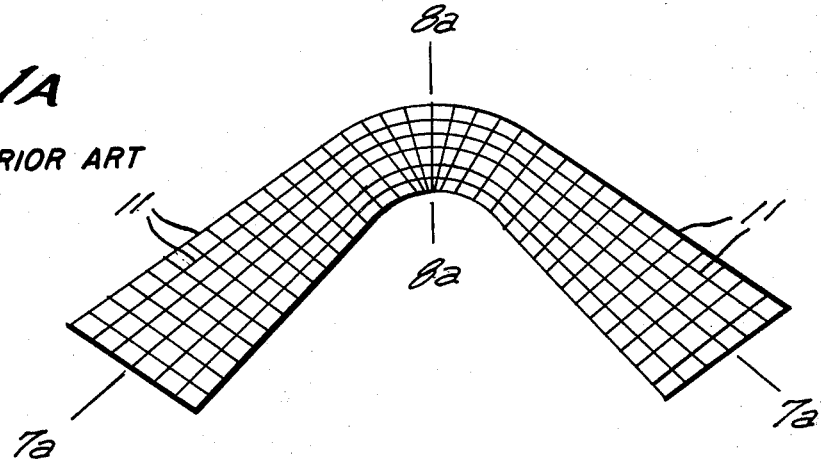
Figure 1B:
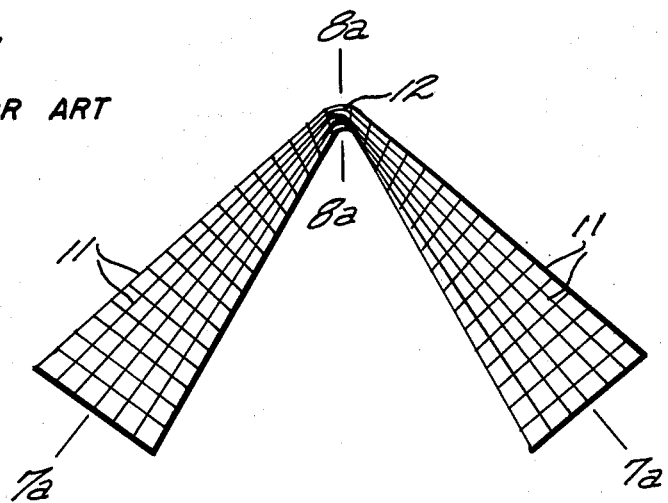

When the hose is bent, as shown in FIG. 1A and FIG. 1B, line 7—7 is transformed from a straight line into an arc 7a—7a. Thus, the yarns which were formerly parallel to straight line 7—7 are also transformed into arcs. However, the bent yarns 11, shown as arcs on the outermost portion of the bend, prevent this portion of the hose from stretching. Consequently, along the center of the bend, i.e., along line 8a—8a, the hose is caused to flatten out until buckling or kinking, as illustrated at point 12 in FIG. 1B, occurs.

In order to reduce the tendency of hose to undergo buckling or kinking upon bending it has been proposed to orient the reinforcing fabric within the hose in the manner of FIG. 2. The warp and filling yarns of FIG. 2 are represented by crossing lines, neither of which are parallel to either line 7—7 or line 8—8. Contrary to a parallel alignment with the fabric lines themselves, the bisectors of the angles formed by these crossing lines are either parallel or perpendicular to line 7—7 or line 8—8, respectively.

Although the fabric shown in FIG. 2 reduces the tendency of the hose of buckle or kink, there is less reinforcement of the hose against lateral expansion along the direction of line 8—8 than in the hose shown in FIG. 1. Thus, the hose of FIG. 2 is prone to lateral expansion when pressure is applied to the hose.

Another problem which may arise when pressure is applied to the hose of FIG. 2 is that the hose may expand or contract in a lengthwise fashion, i.e. along line 7—7. Thus, a sudden application of pressure to the hose may cause a sudden expansion or contraction such that the hose may be said to "jump" under the influence of pressure.

FIG. 3 illustrates a hose assembly according to the present invention which possesses excellent properties with respect to bending as well as with respect to both lateral and longitudinal expansion under pressure. Thus, lines representing one set of yarns, e.g., warp yarns, are perpendicular to the center line 7—7 of the hose. The lines representing the other set of yarns are biased as illustrated so as not to be parallel with line 7—7.

It is noted that the fabrics used to produce the orientation of fibers as depicted in FIG. 2 are generally referred to as bias cut fabrics. Such fabrics are formed by bias-cutting a tubular woven fabric into a continuous strip. An example of a bias cut fabric is shown in U.S. Pat. No. 3,784,427, the disclosure of which is incorporated herein by reference. On the other hand, the fabrics of the present invention are preferably flat woven.

Figure 4:
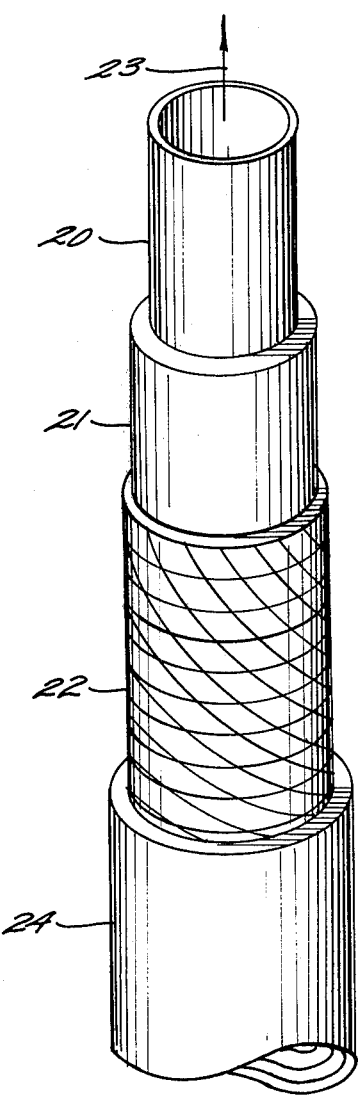
FIG. 4 is an elevation view of a short length of hose with different layers broken away.

FIG. 4 illustrates the layered structure of hose assemblies in accordance with the present invention.

In FIG. 4 a mandrel 20 is coated with a suitable material to form the innermost tube 21 of the hose. Accordingly, mandrel 20 may be a pipe of the desired length and diameter and is preferably coated with a suitable releasing agent prior to the formation of tube 21.

Tube 21 may be formed of a suitable material known by those skilled in the art, such as natural or synthetic rubber.

Reinforcing fabric 22 is applied to tube 21. One set of yarns, e.g., warp yarns, define concentric circles each centered along center line 23 of the hose. Thus, this set of yarns may be said to lie in planes which are perpendicular to center line 23.

As mentioned previously, FIG. 3, in addition to representing a side view of a hose, represents an elevation view of a fabric strip. Thus, proper orientation of the fabric on the hose may be attained by laying the fabric strip shown in FIG. 3, lengthwise, along tube 21. Then the widthwise portion of this strip is wrapped around tube 21 to achieve the orientation of fabric 22 as illustrated in FIG. 4.

The filling yarns of the fabric of FIG. 3 are biased at an angle from the warp yarns of between about 87° and about 65°. More preferably, the warp yarns are biased at an angle from about 80° to about 75°.

For simplification, the angle of bias between the warp and filling yarns shall be referred to herein as the "bias angle". Also, the term "bias angle" shall refer to the smaller of the two angles at which warp and filling yarns intersect.

It will be understood that the hose of the present invention may contain one or more fabric layers which may, optionally, be interdisplaced with other layers found in hose structures.

The final layer to be applied to the hose assembly is cover 24, which may be formed from a suitable hose covering material such as natural or synthetic rubber. Thus, cover 24, as well as tube 21, may be formed from polymeric materials selected from neoprene (i.e., polychloroprene), polyurethane, nitrile rubber (e.g., butadiene-acrylonitrile), butadiene-styrene (i.e, SBR), and vinyl resins.

The reinforcing fabric, according to the present invention, may be formed from any material suitable for use in forming reinforcing fabrics for hose, such as nylon, polyester, cotton, rayon, wire or glass. More particularly, the fabric may be made from Taslanized (DuPont) or textured filament yarn that has been woven flat and square.

It is known that certain fabric materials will not readily adhere to the materials in other layers of hose structures. For example, nylons and polyester are incompatible with various rubber compositions. Accordingly, it has become customary, when necessary, to treat fabrics with a material which will promote adhesion to certain polymers.

One such treating material is a composition containing resorcinol-formaldehyde and a rubber latex (referred to herein as RFL for convenience). Various RFL treatments are described in U.S. Pat. Nos. 3,030,230; 3,240,620; 3,240,649; 3,240,650; 3,240,651; 3,240,659; and 3,240,660. The subject matter of these patents is incorporated herein by reference.

In addition to promoting the adhesion of the fabric to the tube and covering materials, the adhesive system may serve to stabilize the warp and filling yarns within the fabric so that subsequent operations will not alter the bias angle which has been imposed. Furthermore, those skilled in the art will recognize the RFL treatments are capable of rendering the fabrics of the present invention air-impervious. Such a treatment is described in U.S. Pat. No. 3,679,516, the disclosure of which is incorporated herein by reference.

The bias condition of the fabric may be imparted by any suitable means employed by those skilled in the art. Preferably, this bias condition is imparted continuously by machines which are capable of biasing large quantities of fabric at a rapid rate.

One such machine is a bias straightener. Bias straighteners have been available from the Mount Hope Machine Company, Inc.; Taunton, Massachusetts. By a proper setting of the bias strightener, fabric may be passed through rollers in a manner such that one side of the fabric travels further than the opposite side. Thus, the side which travels further is subjected to a stretching force, whereby a bias condition is imparted to the fabric.

The use of a bias straightener to impart bias condition to the fabric has the advantage that, by proper zeroing of the control mechanism, the bias straightener can continuously and automatically adjust the stretching forces to achieve a preset degree of bias. It is noted that control mechanisms for a bias straightener are described by the Robertson et al U.S. Pat. No. 2,795,029.

It will be understood that one or more bias straighteners may be used. For example, two bias straighteners operating in tandem may be used to achieve the desired degree of bias.

Another device which may be used to impart a bias condition to the fabric is a split drive tenter frame. In a tenter frame the fabric is supported and pulled by two rows of moving pins which pierce through the respective sides of the fabric. By controlling the relative speed of movement of the respective rows of pins, one side of the fabric may be stretched with respect to the other side, thereby imparting a biased condition to the fabric. A means for controlling the relative speed of movement of the respective rows of pins in a tenter frame is a split drive unit. Split drive units for tenter frames have been available from Associated Energy Systems, Inc.; 107 Industrial Drive; Matthews, N.C.

Figure 5:
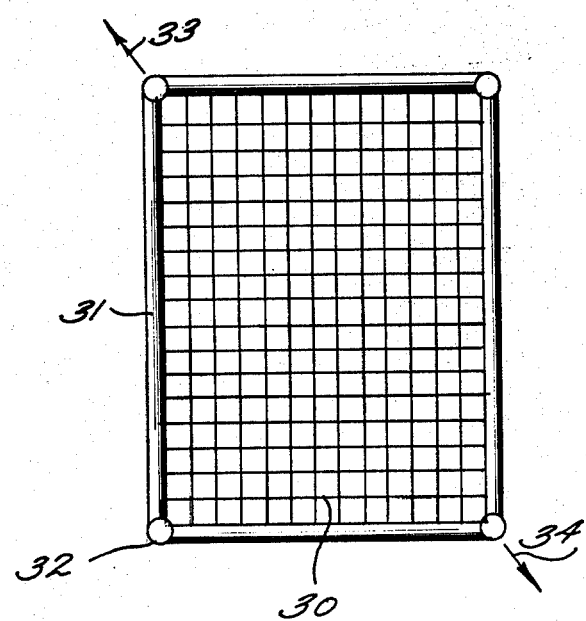
FIG. 5 and FIG. 5A illustrate an example of the manner in which a biasing force may be applied to the reinforcing fabric.
Figure 5A:
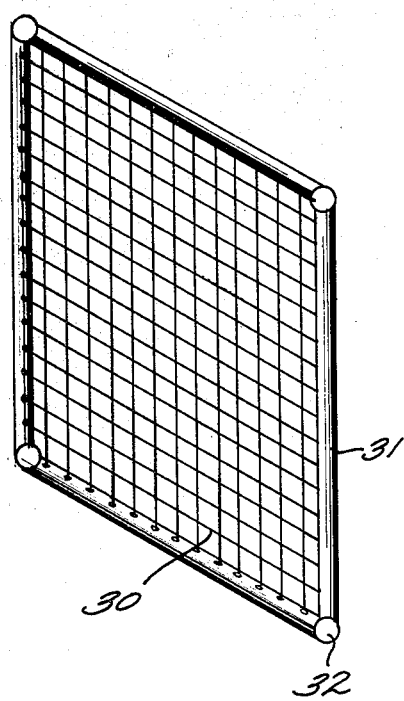

For the purposes of illustrating the present invention, a Pin or Clip Frame is shown in FIG. 5 and FIG. 5A. It will be understood, however, that more sophisticated means for imparting a bias condition to the fabric than a simple Pin or Clip Frame may be employed in accordance with the present invention.

Referring to FIG. 5, the woven fabric 30, having warp yarns running in a vertical direction and filling yarns running in a horizontal direction is placed in Pin or Clip Frame 31. The thusly supported fabric may then be treated with an adhesive system that will adhere to the polymer chosen for the hose construction.

The corners of Pin or Clip Frame 31 each comprise a pivotable hinge member 32. During the treatment of the fabric with the adhesive system, a biasing force may be applied to the Pin or Clip Frame 31, e.g., simultaneously along arrows 33 and 34, in order to impart a bias condition to the fabric. Thus, as illustrated in FIG. 5A, a biased fabric having a bias angle of approximately 78° between the warp yarns and the filling yarns may be obtained.

While the fabric is still in the Pin or Clip Frame 31 or after it has been removed the adhesive composition is cured.

Figure 6:
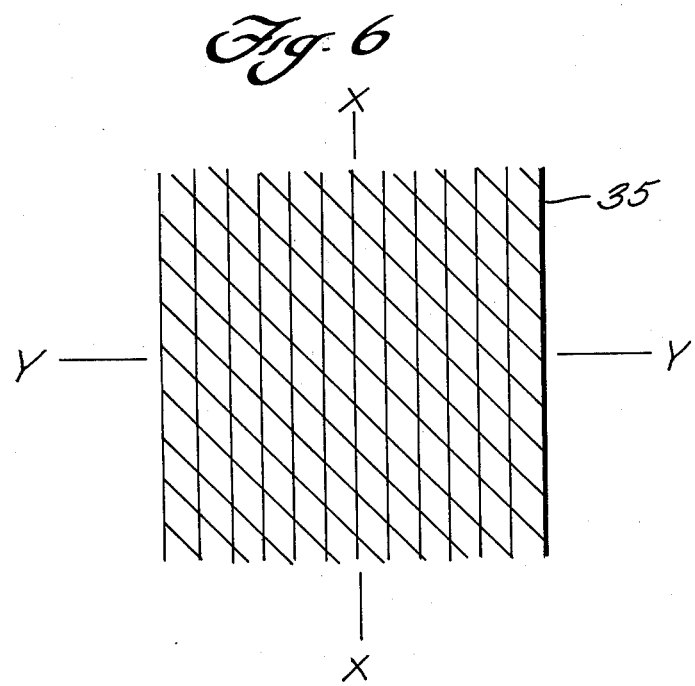
FIG. 6, FIG. 6A and FIG. 6B show the manner in which a biased fabric may be cut or folded in order to form a composite fabric having crossing yarns.

FIG. 6 shows a sheet 35 of biased fabric. According to one embodiment of the present invention, sheet 35 may be cut, e.g., along line Y—Y, to form a plurality of elongated, continuous fabric strips. One such elongated, strip is illustrated in FIG. 3. Since these strips are continuous, no seams are present which would cause a weak point in the hose or an increase in gauge in the seam area.

According to a preferred embodiment of the present invention, the biased fabric sheet 35 may be cut or folded, e.g., along line X—X or Y—Y, in order to form two sides of the fabric. These sides may be then applied to one another in a manner such that the yarns of one set of yarns, e.g., warp yarns, of the respective sides remain parallel to each other, but the yarns of the other set of yarns, e.g., filling yarns, of the respective sides cross each other.

Figures 6A, 6B:
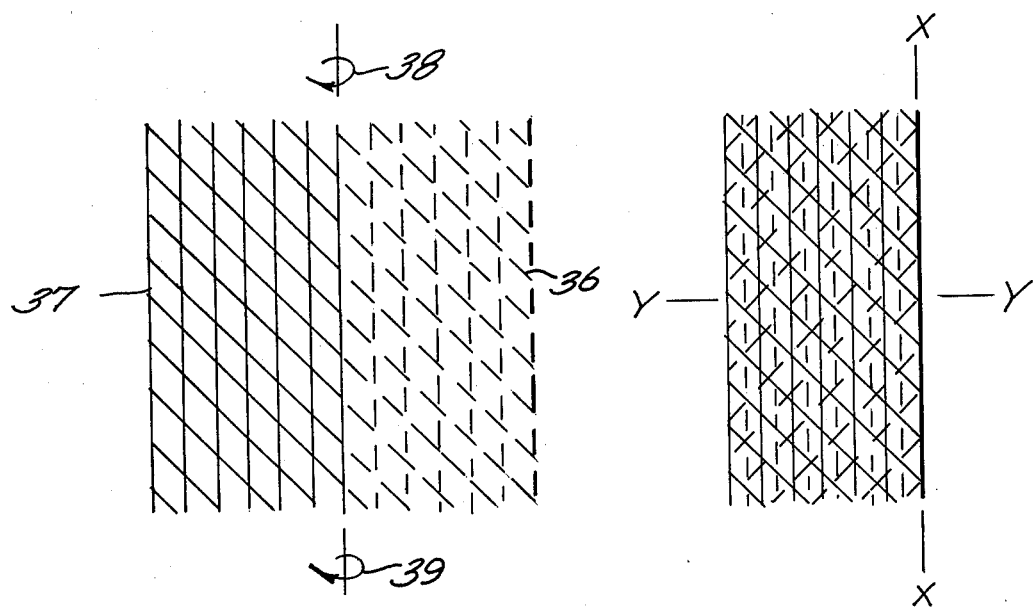

For example, a composite fabric may be formed as illustrated in FIG. 6A and FIG. 6B. FIG. 6A shows a sheet which has been divided along line X—X into side 36 and side 37. In order to more clearly illustrate this division, the yarns of side 36 have been represented by dotted lines. Side 36 may thus be folded over on side 37 in the direction of arrow 38 and arrow 39 in order to form a composite fabric sheet as illustrated in FIG. 6B. As in FIG. 6A, the dotted lines of FIG. 6B represent yarns corresponding to side 36, whereas the solid lines represent yarns corresponding to side 37.

Although FIG. 6B shows the vertical dotted lines equidistantly placed between vertical solid lines, it will be understood that such a representation is for the purposes of illustration only. Thus, it will be understood that yarns represented by these vertical lines may be oriented in a random yet parallel fashion, such that they may possibly overlap when viewed from above.

It will further be understood that the method of folding represented in FIG. 6A represents only one of several techniques for arriving at composite sheets in accordance with the present invention. Thus, the embodiment represented in FIG. 6A as well as other embodiments described herein should be viewed for the purposes of illustration and should not be considered limitive of the scope of the present invention.

Accordingly, FIG. 6B, when viewed in a broad sense, shows a composite fabric sheet in which one set of yarns is shown to be in a vertical position, while another set of yarns is shown as diagonal lines which cross each other. Thus, if the bias angle of the fabric was 76-80°, then the diagonal yarns of the respective sides would cross each other at 150-160°.

The composite sheet of FIG. 6B may be cut in the direction of line Y—Y into a plurality of elongated, continuous fabric strips. One such strip is shown in FIG. 7.

Figure 7:
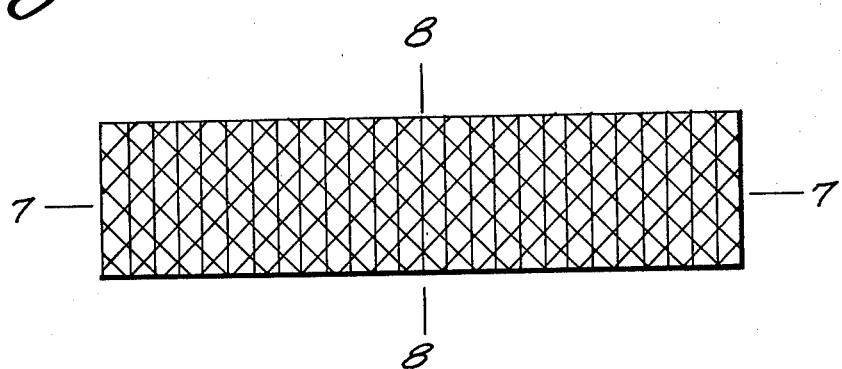
FIG. 7 and FIG. 7A show a preferred composite reinforcing fabric and the manner in which it may be incorporated into a hose structure.
Figure 7A:
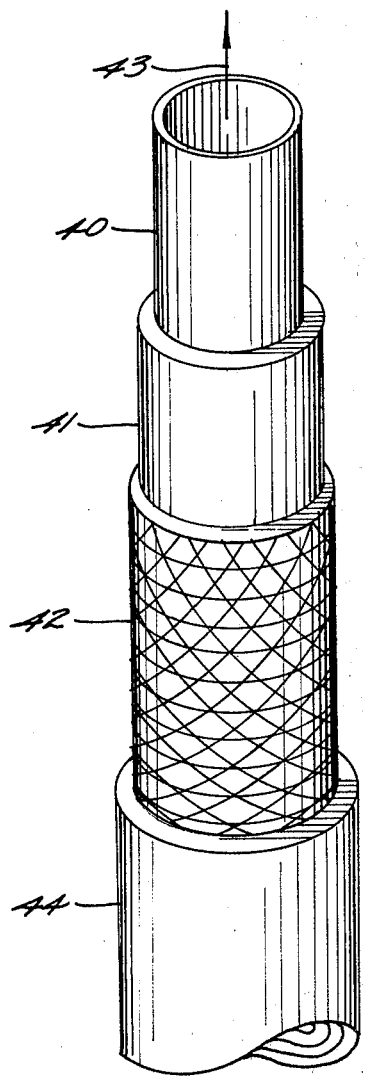

FIG. 7A shows a hose containing a mandrel 40 covered by a tube 41, which tube is wrapped with a composite fabric 42, which fabric is, in turn, coated with a cover 44. An arrow shows the center line 43 of the hose. Thus, FIG. 7A is analogous to FIG. 4 except that the single layer fabric 12 of FIG. 4 is replaced by the dual layered composite fabric 42 of FIG. 7A.

Accordingly, fabric 42 may be applied to tube 41 by laying the strip of FIG. 7 lengthwise along tube 41 in a manner such that line 7—7 runs in the same direction as center line 43 of the hose, followed by wrapping the widthwise portion of the strip around tube 41.

The fabric of the present invention is preferably constructed of textured yarn rather than non-textured, filament or spun yarn in order to gain the inherent ability of textured yarn to compact and extend within itself, however, non-textured spun or filament yarns may be utilized.

For the purposes of the specification and the claims which follow, the term, "textured yarn", is intended to connote yarn made of continuous filaments which are modified so that they do not lie parallel to one another. An example of a textured yarn is available under the trade name of "Cordura" (DuPont). Further examples of textured yarn are provided in U.S. Pat. Nos. 3,911,655; 3,848,404; 3,824,776; and 3,816,994; the disclosures of which are incorporated herein by reference.

The reinforcing fabric is preferably constructed loosely in order to allow sufficient compaction and elongation of the yarn bundles when they are in the body of the hose, such that the desired flex characteristics of the hose are enhanced without substantially adversely affecting the capability of the hose to resist distortion under pressure.

When used in the preferred manner as a railroad air brake hose, the strength and flexibility imparted to the hose by the structure of the present invention will allow a more positive controlling of the braking system of railroad cars by reducing the expansion of the air brake hose when pressure is applied to the system. Furthermore, with the greater fabric angle available, the ability of the hose to withstand buckling or kinking from bending will be greatly improved as will the ability of the hose to flex at operating temperatures from −60 to 150° F.

EXAMPLE

A fabric was designed using a textured 1,000 denier nylong 66 available under the trade name "Cordura" (DuPont) that was constructed in such a way as to have a 14×14 greige count 48 inches wide. This fabric was then impregnated with a resorcinol-formaldehyde/neoprene latex, and during the drying operation of the fabric was biased so as to induce a 75-80° bias angle of the filling yarns to the warp yarns. Optionally, a second run through the drying frame could be made to apply a neoprene surface coating that would cause the fabric to be tacky or sticky. If further biasing of the fabric is necessary, it could be accomplished during this polymer application.

The fabric was then slit lengthwise into two equal parts and was then layered or laminated as illustrated in FIG. 3A in such a way as to have the filling yarns crossing each other and not parallel.

Optionally, the same fabric structure could be accomplished by lengthwise folding of the fabric on itself.

A hose mandrel of 20-25 inches in length with the tube in place was then wound with the above fabric in such a way as to have the warp yarns perpendicular to the center line of the hose. Cover compound and curing tapes were then applied and the hose cured in the standard manner. After curing, the hose was removed from the mandrel.

Although the foregoing Example demonstrates how a balanced fabric may be used in accordance with the present invention, it will also be understood that unbalanced fabrics may be so used. For example, an unbalanced fabric comprising a 1000 denier Cordura Nylon warp having a count of 18 ends and a filling of 210 denier filament nylon having a count of 10 picks may be biased and incorporated into a hose structure in accordance with the present invention. When such unbalanced fabrics are used, the thicker and stronger yarn component, e.g., the warp yarns, are oriented in a circular fashion about the circumference of the hose in order to more fully provide support against expansion of the hose under pressure.

While certain representative embodiments and details have been shown for the purpose of illustrating the invention, it will be apparent to those skilled in the art that various changes and modifications may be made therein without departing from the spirit or scope of the invention. It will further be understood that the invention may comprise, consist essentially of or consist of the steps or materials recited herein.

What is claimed is:

1. A hose comprising a layer of a reinforcing fabric between an inner natural or synethetic rubber tube and an outer natural or synthetic rubber covering, said reinforcing fabric having two sets of yarns, said sets of yarns consisting of warp yarns and filling yarns, wherein:
    (i) the bias angle between the warp yarns and the filling yarns of said fabric is biased from about 87 degrees to about 65 degrees; and
    (ii) the yarns of one set of yarns are circumferentially perpendicular to the center line of said hose.
2. A hose according to claim 1, wherein said bias angle is from about 8 degrees to about 75 degrees.
3. A hose according to claim 1, wherein said yarns are textured nylon yarns.
4. A hose comprising:
    an inner natural or synthetic rubber tube;
    an outer natural or synthetic rubber covering;
    between said tube and said covering a reinforcing layer formed of a dual-layered fabric consisting essentially of two fabric layers adhered to one another, wherein:
    said layers contain a first set of yarns and a second set of yarns, said sets of yarns consisting of sets of warp yarns and sets of filling yarns; each layer has a bias angle between the warp yarns and the filling yarns biased from about 80° to about 75°; said first set of yarns of the respective layers are parallel; and said second set of yarns of the respective layers cross at an angle between about 150° and about 160°; and
    wherein the yarns of said first set of yarns of said dual-layered fabric are circumferentially perpendicular to the center line of said hose.
5. A hose according to claim 4, which comprises an inner neoprene tube and an outer neoprene covering.
6. A method for manufacturing a hose comprising the steps of:
    (a) coating a mandrel with a tube of natural or synethtic rubber;
    (b) wrapping a reinforcing fabric around said tube; and
    (c) coating said fabric with a covering material of natural or synthetic rubber, wherein:
        (i) said reinforcing fabric has a bias angle between the warp yarns and the filling yarns of said fabric biased from about 87 degrees to about 65 degrees; and
        (ii) said reinforcing fabric is incorporated in said hose in a manner such that said warp yarns of said fabric are circumferentially perpendicular to the center line of said hose.
7. A method according to claim 6, wherein said reinforcing fabric is in the form of an elongated tape and wherein said wrapping step (b) comprises laying said tape lengthwise along said tube and wrapping the widthwise portion of said tape around said tube.

* * * * *